(12) United States Patent
Divivier et al.

(10) Patent No.: US 6,212,181 B1
(45) Date of Patent: Apr. 3, 2001

(54) METHOD FOR USING THE DEPARTURE QUEUE MEMORY BANDWIDTH TO SUPPORT ADDITIONAL CELL ARRIVALS IN AN ATM SWITCH

(75) Inventors: Robert J. Divivier, San Jose; Christopher B. Bergen, Sunnyvale; Gary S. Goldman, San Jose, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/277,657

(22) Filed: Mar. 26, 1999

(51) Int. Cl.[7] .............................. H04L 12/50; H04L 12/28
(52) U.S. Cl. ............................................ 370/379; 370/395
(58) Field of Search .................................. 370/392, 394, 370/395, 397, 399, 229, 232, 294, 375, 376, 369, 381, 431, 433, 437, 442, 444, 455, 458

(56) References Cited

U.S. PATENT DOCUMENTS

| | | | |
|---|---|---|---|
| 5,130,975 | * 7/1992 | Akata | 370/416 |
| 5,390,184 | * 2/1995 | Morris | 370/353 |
| 5,392,280 | * 2/1995 | Zheng | 370/353 |
| 5,668,812 | * 9/1997 | Akiyoshi | 370/474 |
| 5,729,292 | * 3/1998 | Acampora et al. | 348/390 |
| 5,850,392 | * 12/1998 | Hauser et al. | 370/398 |
| 5,914,934 | * 6/1999 | Rathnavelu | 370/229 |

* cited by examiner

Primary Examiner—Chau Nguyen
Assistant Examiner—Chiho Andrew Lee
(74) Attorney, Agent, or Firm—Blakely, Sokoloff, Taylor & Zafman LLP

(57) ABSTRACT

A system and method for assigning departure timeslots to arrival data in an ATM switch is described. The departure timeslots are assigned to arrival data when no departure data is pending or when arrival data has a higher priority than pending departure data.

8 Claims, 3 Drawing Sheets

METHOD FOR USING THE DEPARTURE QUEUE MEMORY BANDWIDTH TO SUPPORT ADDITIONAL CELL ARRIVALS IN AN ATM SWITCH

1. Field of the Invention

The present invention relates generally to transferring information over a network. More particularly, the present invention relates to an improved memory arbitration system used in transferring information between devices in a network.

2. Background of the Invention

Modern network devices transfer information using a protocol such as the asynchronous transfer mode (ATM) protocol in which data is transferred in "cells," or fixed-length packets. In a shared memory switch, each data cell is stored in a memory device (typically Dynamic Random Access Memory or DRAM) before being transmitted towards its destination. The memory device for storing data cells is typically referred to as cell memory. As each cell arrives, an arrival engine determines where to store the cell in cell memory. A departure engine chooses a cell to retrieve from cell memory for transmission. A cell memory controller executes the instructions from the arrival and departure engines, to transfer the cell to or from the cell memory, typically on a timeslot basis.

Data arriving at the arrival engine may include external data and internal data. External data arriving from an external source (such as a physical line) typically cannot be throttled because the source of the data does not respond to feedback signals from the arrival engine. Thus, flow control is unavailable. When external data arrives, the data is written to the cell memory.

The arrival engine also handles internal data. Internal data, such as operation and maintenance cells, is typically internally generated traffic or data which arrives from a control plane. Internal data is typically assigned a low priority because flow control is available to slow the flow of internal data without loss of data. However, the system receiving the data generally guarantees a specified minimum bandwidth to the internal data. Failure to provide such a minimum bandwidth may result in a "starvation" situation. Thus, when the minimum bandwidth is not provided, the internal data is assigned a higher priority.

A circuit element such as a cell memory receiving arrival data also outputs departure data. Thus, current systems maintain a predetermined bandwidth for departure data. Current systems are therefore designed to allocate bandwidth to accommodate (1) a maximum external data flow, (2) a minimum bandwidth of internal data, and (3) a minimum transmission of departure data. In order to accommodate such systems, a typical design may divide each memory access opportunity into timeslots, and allocate a fixed number of timeslots to input data and a fixed number of timeslots to departure data.

Such preset systems are typically designed to have excess capacity or to drop data when excessive incoming data arrives.

SUMMARY OF THE INVENTION

A method of assigning timeslots in an asynchronous transfer mode (ATM) switch is described. In the system, a departure timeslot is used to receive arrival cells when no cell departures are scheduled.

In an alternate embodiment, the system prioritizes arrival data and utilizes a departure timeslot for arrival data when high priority arrival data is pending.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A method and apparatus for controlling the flow of data to and from a shared memory is described. One embodiment of the invention uses an arbitration circuit that receives data on a plurality of input lines and outputs data on a plurality of departure lines. The arbiter monitors arrival data from both external and internal sources as well as departure data. When higher priority arrival signals are received, the arbiter reallocates departure lines to handle the higher priority arrival signals.

Figure 1:
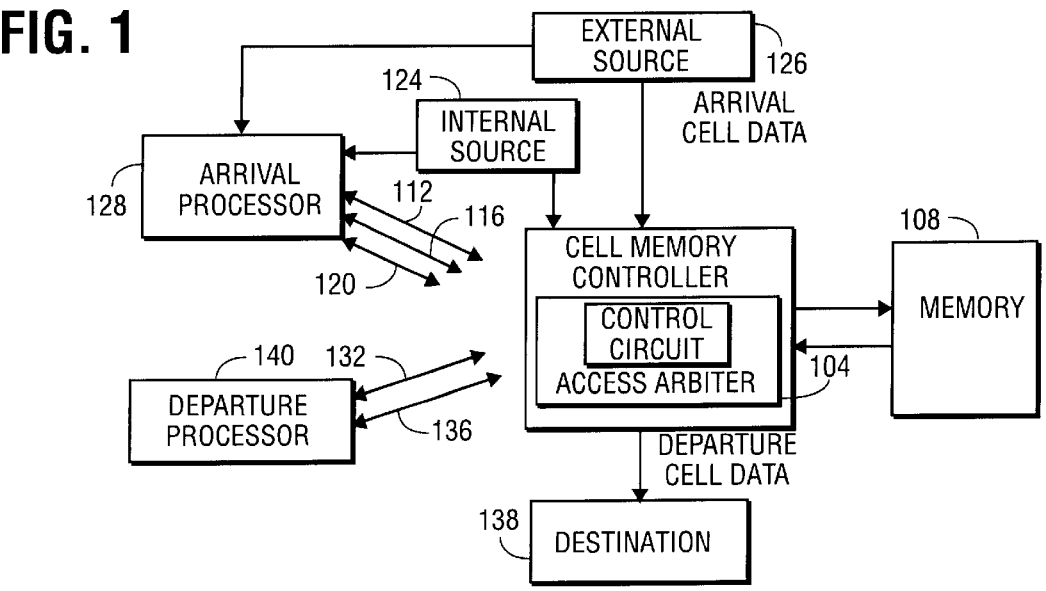
FIG. 1 shows a block diagram of a system to transfer data to and from a memory.

FIG. 1 shows an access arbiter 104 in the cell memory controller to control the flow of information, e.g., memory access controls and cell data, to and from a memory device 108 such as a cell memory. The access arbiter receives in the arrival engine, cell memory write request signals along control lines 112, 116, 120 that are associated with arriving cells from a plurality of data sources such as internal source 124 and an external source. The access arbiter also receives in the departure engine cell memory read request signals along control lines 132, 136 that are associated with departing cells from a plurality of data destinations. When a write request is granted to an arrival source, the cell memory controller transfers the arriving cell to the cell memory. When a read request is granted to a departure destination, the cell memory controller transfers the departing cell from the cell memory. For one embodiment of the invention, the block diagram of FIG. 1 (except the memory) is implemented in an ASIC, and the memory is implemented with DRAM. In an alternate embodiment, the invention may be implemented in discrete circuit elements.

Access arbiter 104 allocates arrival bandwidth resources among three competing data flows. As previously described, data from some sources such as arrival processor 128 cannot be back pressured and, thus, the access arbiter 104 allocates a transmission path when external arrival data is received to avoid loss of the data. Thus, when external source 128 outputs data, control lines 112, 116, 120 provide access to arbiter 104 and memory 108. Access arbiter 104 monitors data to provide a minimum bandwidth to internal source 124 to prevent starvation conditions. For an alternate embodiment, internal source 124 monitors the minimum bandwidth allocation and indicates when more bandwidth is needed to prevent starvation conditions. Access arbiter 104 also provides transmission paths for outgoing data from memory 108 along lines 132, 136 to departure processor 140.

A comparison circuit within access arbiter 104 continues to monitor the arriving data and the outgoing data. When high priority signals from an arrival request such as signals from an external source or from an internal source is asserted to meet minimum bandwidth requirements, the access arbiter may utilize a departure line or departure timeslot for arrival signals. Thus, a control circuit within access arbiter 104 switches to allow data to arrive on a departure access timeslot. Departure access timeslots continue to be used for arrival data until one of several conditions are met such as, when high priority requests are satisfied or minimum bandwidth requirements are met. Although the preceding description describes arrival request lines 112, 116, 120 and departure request lines 132, 136, it is recognized that these lines may be timeslots on a single physical line.

A second condition which causes the use of a departure access as an input access for arriving data is when departure access is not needed because no departure request signals are active. Under such conditions, departure accesses corresponding to request line 132 may be used to handle incoming low priority arrival signals.

Figure 2:
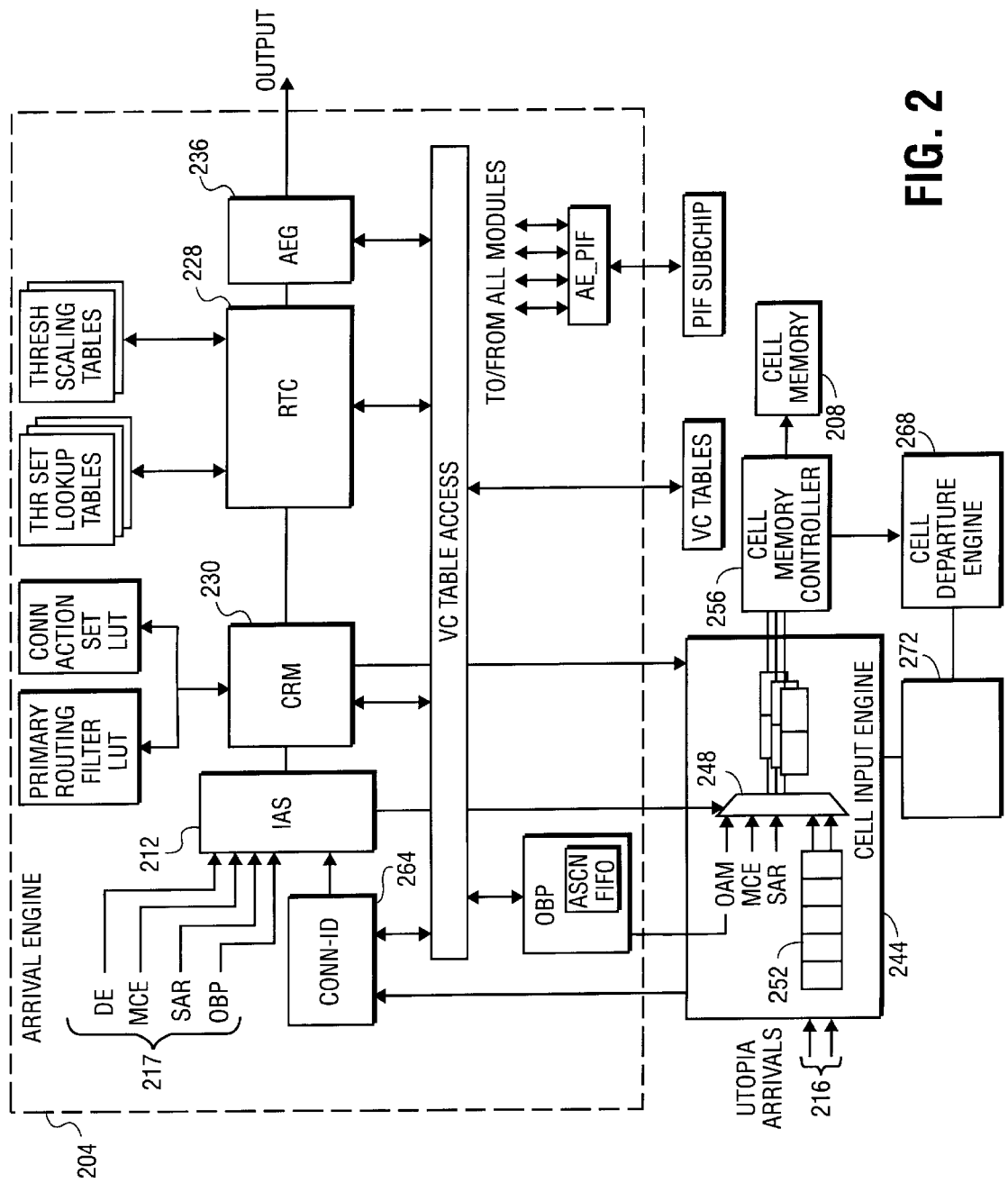
FIG. 2 illustrates one embodiment of an arrival engine used to control a flow of data to a cell memory controller.

FIG. 2 illustrates an arrival engine to process arriving data for one embodiment of the present invention. Processing is performed in time periods referred to as cell ticks. Each cell tick is a time quantum equal to the processing time of an ATM cell at a desired throughput rate. A cell tick may include a plurality of clock cycles.

Arrival engine 204 processes incoming data in a pipeline arrangement. Arrival engine 204 controls data flows to cell memory 208. In particular, an input arrival selector (IAS) 212 of arrival engine 204 arbitrates among external arrivals such as UTOPIA arrivals 216 and internal arrival sources 217 (such as DE, departure engine, MCE multicast engine, SAR segmentation and reassembly, OBP OEM background processor) as well as departure data from cell memory 208. Other elements in the arrival pipeline include: (1) a cell routing and modification (CRM) 230 which determines the destination queue in cell memory 208 for arrivals, (2) a resource threshold checker (RTC) 228 which determines whether to accept or discard the cell based on cell memory thresholds, and (3) an arrival event generator (AEG) 236 which maintains frame based discard state and updates operations administration and maintenance (OAM) statuses for each arrival. CMC 256 receives the output of the arrival engine pipeline and updates a database to track how cells belonging to a queue are stored in cell memory.

Arrival engine 204 controls a flow of input data to cell memory controller (CMC) via a cell input engine (CIE) 244. External signals such as UTOPIA arrivals 216 enter CIE 244. The UTOPIA arrivals 216 are coupled to inputs of a multiplexer 248. A memory such as buffer 252 temporarily stores the UTOPIA arrivals for short periods of time before transmission to multiplexer 248. The output of multiplexer 248 is coupled to cell memory controller (CMC) 256. Control information (i.e., the ATM cell headers) associated with UTOPIA arrivals 216 are transmitted along a UTOPIA arrival line 260 to a connection identifier 264 which communicates information regarding the validity of arrival cells to the IAS 212.

IAS 212 uses the source and validity of arriving data packets to determine a priority of the incoming arrival data packets. The IAS 212 uses the determined priority to set a select line of the multiplexer 248 to select between UTOPIA arrivals 216, other internally generated inputs such as OAM, multicast (MCE) and segmentation and reassembly (SAR) data and UTOPIA departures from the departure engine. Internal data such as MCE data and SAR data send a priority indication to the IAS 212. The priority indication may be based on configured bandwidth parameters. The determined priority is used to set a select line of multiplexer 248. At any particular point in time, such as over a cell tick, the input multiplexer can be switched to allow two to three packets to exit multiplexer 248 to cell memory controller 256 where the data is communicated to cell memory 208.

Cell memory 208 also outputs data. Thus, during portions of a cell tick, cell memory 208 outputs data to CMC 256. CMC 256 outputs data to a departure pipeline similar to arrival engine pipeline 204. The output data typically may take two cell memory access timeslots.

Cell Departure Engine CDE 268 outputs data to a second state machine. In order to coordinate data flow and allow arrival data to use departure timeslots, the IAS 212 links the operation of CIE 244 to CDE 268. IAS 212 determines when arrival data takes priority over departure data. When arrival data takes priority over departure data, IAS 212 instructs CMC 256 to reallocate additional lines and/or timeslots usually reserved to communicate departure data to instead communicate high priority arrival data.

Figure 3A:
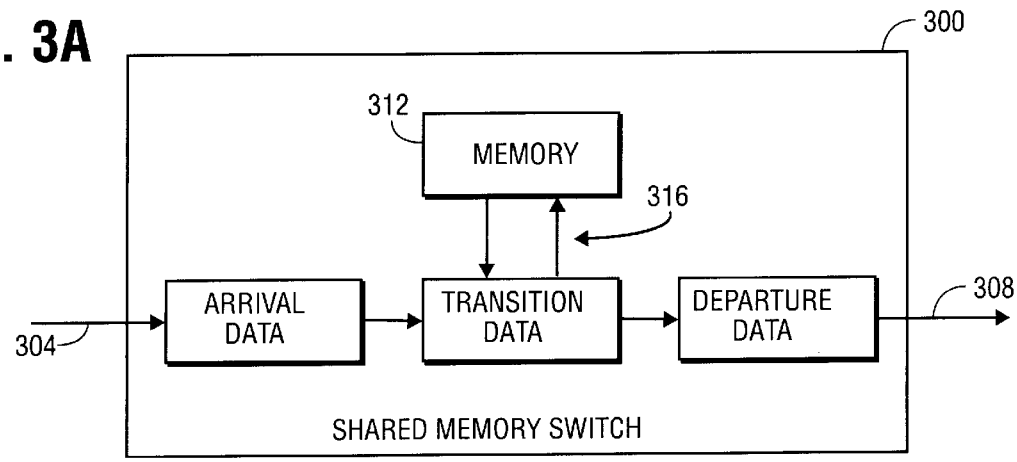
FIG. 3A illustrates a shared memory switch and FIG. 3B shows an example allocation of read signals and write signals.
Figure 3B:
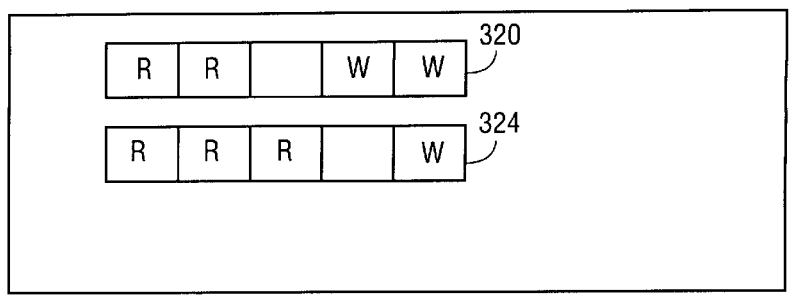

FIG. 3A and 3B illustrates reallocation of timeslots within CMC 256. FIG. 3A illustrates an example circuit to transfer data to and from a memory and FIG. 3B illustrates an operation to convert a read operation to a write operation to handle additional incoming cells. In FIG. 3A memory system 300 handles incoming or arrival data 304 and outputs transmitted or departure data 308 to and from cell memory 312.

In order to prevent simultaneous transmission and reception of data along data path 316, typically a "dead cycle" is used between reads and writes to cell memory 312. FIG. 3B illustrates shifting of the dead cycle in a transition from two reads followed by a dead cycle and a subsequent two write cycles in row 320 to three reads followed by a single write as illustrated in row 324. It is noted that the total number of reads and writes in a complete time cycle always sums to four in the illustrated embodiment. Thus three reads may be accompanied by one write, three writes may be accompanied by one read or there may be two reads and two writes.

Figure 4:
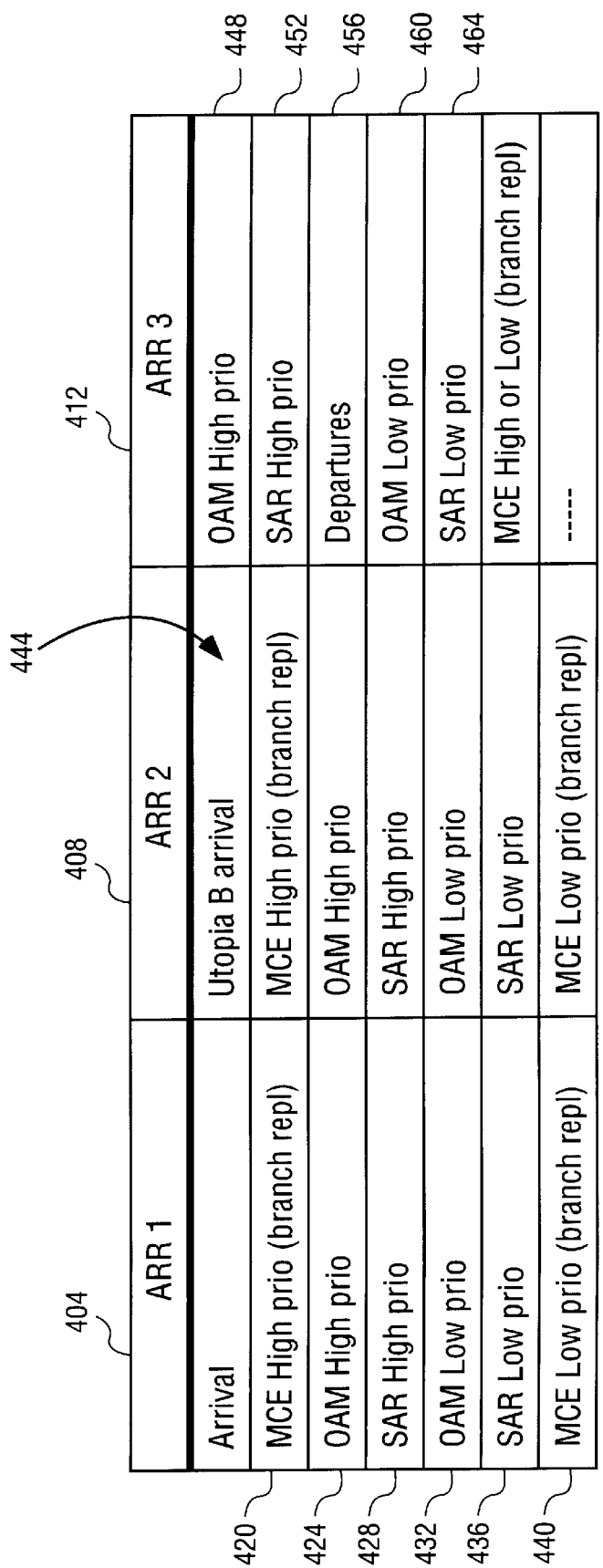
FIG. 4 is a table illustrating one system for prioritizing arrival and departure signals.

In the embodiment illustrated in FIG. 4, UTOPIA A arrivals are directed towards first arrival slot 404 and UTOPIA B arrivals are transmitted to second arrival slot 408. Internal arrive sources may be transmitted to any of the three arrival slots 404, 408, 412. In the illustrated embodiment, at most two arrivals and two departures or three arrivals and one departure may be accepted per cell tick although different numbers, such as four arrivals and zero departures per cell tick are also possible. Arrival slot 412 is configured to handle both departures and arrivals.

When a UTOPIA arrival (A or B) is not valid, the UTOPIA arrival may be replaced by an alternate arrival from an internal source. In one example, arrival slot 404 is replaced before arrival slot 408. When arrival slot 404 is replaced, a prioritization scheduler for arrival slot 404 selects an alternate source. For example, when the internal source MCE is asserting a high priority request, arrival slot 404 will be granted to the internal source MCE regardless of the state of the requests from internal sources OAM and SAR.

After the second highest priority position occupied by high priority multicast request 420, the ordering of priority is OAM high priority request 424, SAR high priority request 428, OAM low priority request 432, SAR low priority request 436 and MCE low priority request 440.

As described, internal arrivals, from MCE, SAR and OAM, first use otherwise empty invalid arrival and departure slots 404, 408, 412. When the first arrival slot 404 and second arrival slot 408 are used during a time cycle, low priority internal arrivals use empty departure slots when available. When an internal arrival source is assigned insufficient arrival bandwidth, the internal arrival source can assert a high priority signal request. High priority requests can steal or block departures in order to get into the arrival pipeline as illustrated in third arrival slot 412.

Third arrival slot 412 handles both arrival and departure requests. In third arrival slot 412, OAM high priority and SAR high priority internal arrivals 448 and 452 receive higher priority over departure cell 456. In time cycles when no high priority internal arrivals are received, and a departure is not pending, the OAM low priority 460 and SAR low priority 464 requests may be granted. At the lowest priority, are MCE cell read requests.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of assigning timeslots in an ATM switch comprising:

detecting when high priority arrival data is received;

assigning a departure timeslot to the high priority arrival data and postponing transmission of departure data;

receiving the high priority arrival data in the departure timeslot;

transmitting the departure data in a subsequent departure timeslot; and wherein internal arrival data from an internal source is classified as high priority arrival data when insufficient bandwidth is provided to the internal arrival data.

2. The method of claim 1 wherein the high priority arrival data is high priority operations administration and maintenance (OAM) data.

3. The method of claim 1 wherein the high priority arrival data is segmentation and reassembly (SAR) data.

4. The method of claim 2 wherein the detecting of the high priority arrival data includes monitoring header information of the arriving data with an access arbiter.

5. The method of claim 2 wherein the data transmitted in a departure timeslot is transmitted on a first line, the first line different from a second line used to receive arrival data during arrival timeslots.

6. A system to allocate departure timeslots between arrival data and departure data, the system comprising:

a comparison circuit to monitor arrival data and departure data and signal when departure timeslots are needed for arrival data;

a control circuit within an access arbiter, the control circuit to receive the signal from the comparison circuit and to switch the access arbiter to receive arrival data in a departure timeslot;

a table of priorities accessed by the comparison circuit to determine when arrival data takes precedence over pending departure data; and wherein internal arrival data from an internal source is classified as high priority arrival data when insufficient bandwidth is provided to the internal arrival data.

7. The system of claim 6 further comprising:

a multiplexer to receive external arrival signals, a select line of the multiplexer controlled by an output of the access arbiter, the output of the multiplexer coupled to a cell memory controller.

8. The system of claim 7 further comprising:

a cell memory to receive the output of the cell memory controller.

* * * * *